United States Patent Office 3,759,815
Patented Sept. 18, 1973

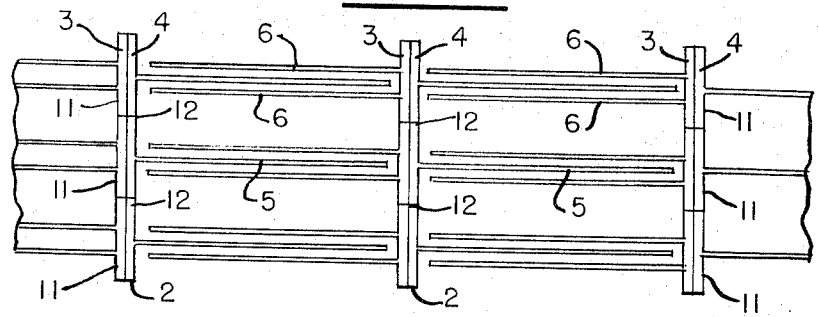
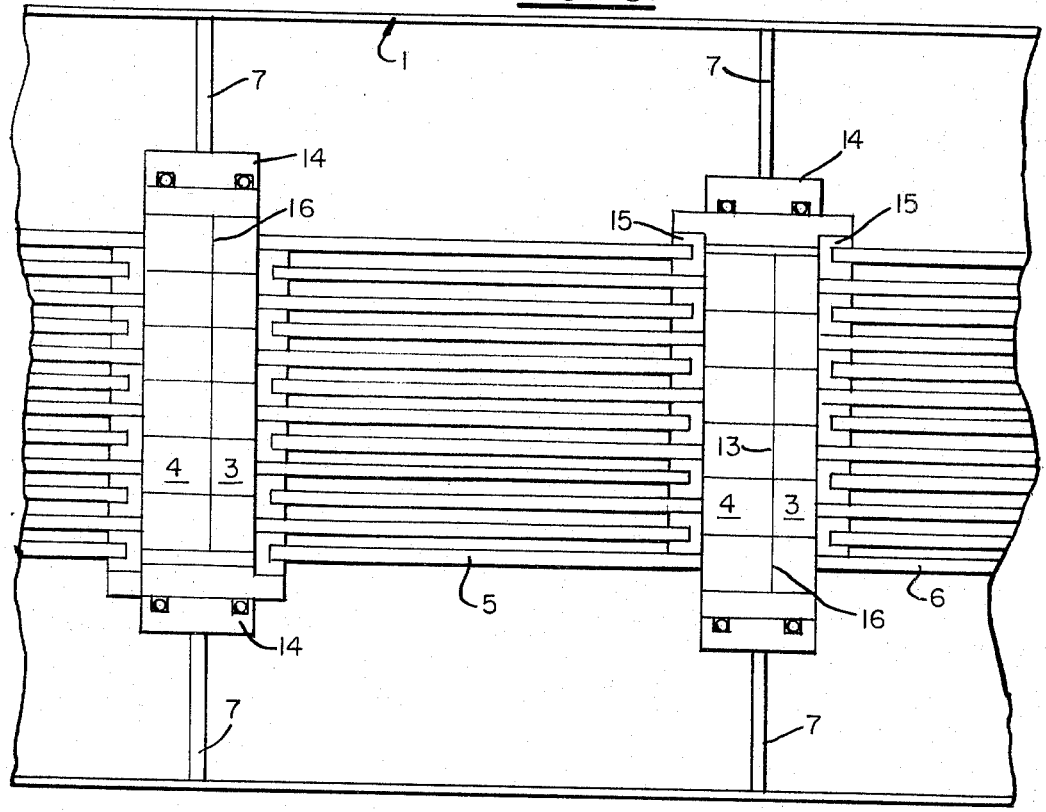
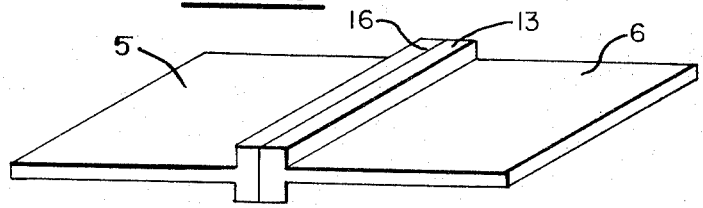

3,759,815
ELECTRODE ASSEMBLY
Karl-Georg Larsson, Sundsvall, Sweden, assignor to
KemaNord AB, Stockholm, Sweden
Filed Nov. 23, 1971, Ser. No. 201,531
Claims priority, application Sweden, Nov. 26, 1970,
16,005/70
Int. Cl. B01k 3/06; C01b 11/26
U.S. Cl. 204—268
5 Claims

ABSTRACT OF THE DISCLOSURE

An electrode assembly for use in an electrolyzing cell comprising a bimetallic base plate from which parallel electrode plates extend. One metal of the bimetallic base plate and the protruding electrode plates serves as the cathode while the other metal and its protruding electrode plates serves as the anode. A number of these electrode assemblies can be arranged in a substantially parallel relationship within a cell box so as to form separate cell units in an electrolyzing cell.

BACKGROUND OF THE INVENTION

In recent years the technique of electrolytic processes has advanced rapidly. The transition from unipolar to bipolar cells has been particularly remarkable. Bipolar cells, in general, can be made more compact than the corresponding unipolar cells and they therefore occupy less space. Furthermore there is the advantage that the number of series-connected current conductors can be reduced, thus diminishing the current losses. It is also easier to construct a closed bipolar cell (with a gas light cover), this enabling easier utilization of possible gaseous products. Another tendency in this electrolytic process development is that the graphite previously employed as anode material is being replaced by metal electrodes coated with precious metal or precious metal oxides, which are referred to as dimension stable electrodes (DSA-electrodes).

Bipolar cells in principle can be constructed in two modes, they are either of the filter press type or they are constructed according to the so called PPG system. One exponent of the filter press type is shown by ICI in their Norwegian Patent 110,911. An alternative placement of electrodes is shown by PPG in U.S. Pat. 3,203,882. These two cell types have both advantages and disadvantages. The greatest criticism of the filter press type is that (1) a complicated piping system has to be provided for the inlet and discharge of the electrolyte as well as for the discharge of the products formed and (2) deactivation of one anode or cathode side of an electrode can completely block the passage of the current. Further, it is impossible to build large units because the size of the electrode surface must, for reasons of stability, be limited.

The PPG system in this respect is better because the anode and/or cathode surfaces in each cell are divided into a number of parallel electrodes. However, in its original version the PPG system has several weaknesses. The electrode packs composed of the units electrodes are difficult to keep bolted together and they are sensitive to current leakage because the requisite tight relationship between the cell units is difficult to attain. Furthermore the deactivating of one anode or one cathode surface will affect the adjacent electrodes, thereby disturbing the flow pattern of the current. It is also difficult to determine where breakdowns of the electrodes occur.

As a consequence of the introduction of DSA-electrodes, the electrolysis technique has advanced.

Several good cell constructions have been developed for unipolar cell systems based upon DSA electrodes, but for bipolar cell constructions the development of such good cell constructions has not yet been reached.

DESCRIPTION OF THE INVENTION

The present invention relates to electrode assemblies using DSA anodes which eliminate most of the disadvantages of the PPG-type electrodes. My invention results in a stable electrode construction, easy detection of electrode breakdowns, and extremely low current losses. At the same time my invention makes it possible to use different anode and cathode materials, thus permitting a choice of material and a choice of possible activating surface coating, the latter made specifically for the requirements of the electrode.

My construction is not limited to cells without diaphragms but may also be used with advantage for bipolar diaphragm cells.

The electrode assemblies of the present invention comprise a laminated base plate consisting of two intimately joined metals, the base plate being provided with anodes and cathodes projecting at right angles from respective portions of the base plate. The anodes and cathodes are formed from the same materials as the base plate. The metals should be selected to fulfill the desired requirements of the anodes and cathodes. This arrangement as a whole will be referred to as the electrode assembly in the following disclosure.

For example, when electrolyzing chloride containing solutions it is suitable that one of the metals in the base plate is titanium (from which titanium anodes project) and the other metal is iron (from which iron cathodes projects.)

Another characteristic feature of the invention is that the base plate together with partition side members made of resistant, non-conductive material (for example of plastic material or material with a rubber coating), when closely fitted to the bottom, the side walls and the cover of the cell box will divide the cell space into units cells having different potential at the sides of the partition wall.

By arranging the joint or junction of the two metals of the base plate as a part of the partition wall between cell units, the metal joint, being very sensitive to corrosion, is placed in an electrically neutral zone, and thus, in connection with the electrically insulating partition side members, a suitable arrangement is provided for protection of the joint. It is particularly advantageous if the joint is displaced to the cathode side of the base plate by using a thicker anodic metal lamination.

The arrangement of partition side members connected to the base plate will give an excellent stability to the cell package. By connecting measuring wires to the base plates in the bipolar cell package the voltage drop over the cell units may be measured and the operation kept under safe control. Possible electrode breakdown will be signalled by a very clear indication in the cell voltage.

There are many possible ways in which the electrodes can be arranged on the base plate. The electrodes may be uniformly arranged over a base plate so that they are all an equal distance apart. In such arrangements one outer anode surface and one outer cathode surface will usually not be fully functioning. If one of the electrodes is particularly expensive the number of electrodes of the opposite kind may be increased so that all surfaces of the expensive electrode will be fully functioning. From the view-point of electrolyte circulation and installation it is sometimes suitable to arrange the electrodes in groups on the base plate. The groups may have equal or non-equal numbers of anodes and cathodes and they may be spaced apart at varying distances.

From the view-point of installation and keeping spare parts, it is sometimes convenient to put the electrode assembly together from unit members or modules. In this case the partition zones of the anode end and cathode end are provided with a single or double flange which will be joined to or fit within the corresponding flange of the next adjacent unit member or module. The partition zones and flanges together form the base plate in the assembly.

By combining a number of electrode assemblies by overlapping or interfitting anodes and cathodes, a bipolar cell package is constructed. The current is introduced and led away respectively by unipolar electrode assemblies, to which the current leaders are connected in the usual manner. The unipolar assemblies are in principle constructed by splitting a bipolar assembly along the joining line within the base plate.

DETAILED DESCRIPTION OF THE DRAWINGS

A cell embodiment for electrolysis of sodium chloride to sodium chlorate according to the invention is illustrated in the attached drawings, wherein:

FIGS. 2 through 4 are partial plan views similar to FIG. 1 but showing other arrangements of different numbers and types of anodes and cathodes;

FIG. 5 is a plan view similar to that of FIG. 1 but showing in more detail an alternative arrangement of the electrodes; and FIG. 6 is an isometric view of a unit electrode member showing how the ends of an anode and a cathode can be joined together, resulting in a double rib or flange.

The same reference numerals are used in the drawings to refer to similar parts.

Figure 1:
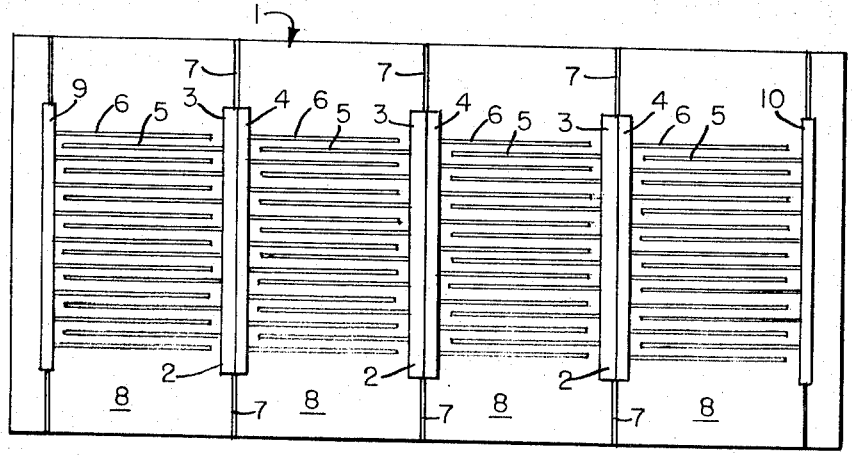
FIG. 1 is a plan view from the top of an electrolysis cell showing schematically the arrangement of base plates and electrodes (the electrode assemblies)

Referring to FIG. 1, numeral 1 indicates the cell box. Within said box are arranged a number of base plates 2 consisting of two metal layers of titanium 3 and iron 4. A number of titanium anodes 5 project from the titanium surface 3 and a number of iron cathodes 6 project from the iron surface 4, each electrode being arranged in the cell box between two electrodes extending outwardly from the opposite electrode plate. The vertical sides of each electrode plate 2 are connected to the side walls of the cell 1 by means of side members 7 which complete the division of the cell into cell units 8. The current is introduced by means of terminal electrodes 9 and 10, end electrode 9 consisting of a plate of iron provided with iron cathodes 6 and end electrode 10 consisting of a titanium plate provided with titanium cathodes 5.

Figure 2:
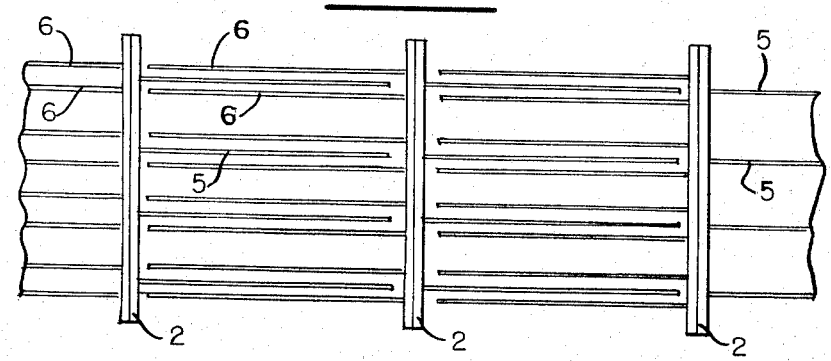

FIG. 2 shows an arrangement of groups of electrodes each electrode 2 consisting of two iron cathodes 6 projecting outwardly from one side and one titanium anode 5 projecting from the opposite surface.

Figure 3:
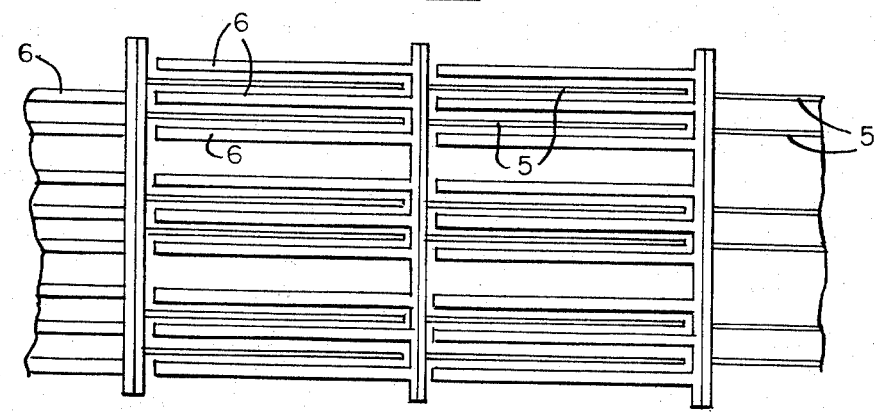

FIG. 3 shows three relatively thick iron cathodes 6 and two relatively thin titanium anodes 5 projecting in a manner similar to FIG. 2. FIG. 3 also indicates the possibility of spacing the anodes further apart without increasing the electrode gap by employing thicker cathode plates. This arrangement can be used if the anodes are bolted to the base plate.

FIG. 4 is similar to FIG. 2 but showing that the metal electrode plates can be divided into units 11 joined together at their ends 12.

FIG. 5 shows on a larger scale an arrangement of a type similar to that of FIG. 4. The electrode assembly is composed of electrode units, for example a titanium anode 5 and an iron cathode 6, joined together longitudinally and provided with a double flange 13. The electrode units are arranged and pressed into electrical connection by means of the members 14 which are directly connected with the side members 7 which lead to the side walls of the cell box 1. It should be observed that the outer extremities of both the anodes 5 and cathodes 6 are secured and fixed by means of spacers 15 of insulation material (i.e. Teflon or rubberlike materials) extending the length of the vertical free edges. The spacers need not, however, extend the full length of the free edges.

FIG. 6 shows a single electrode unit comprising an anode end 5 and a cathode end 6 both provided with a double flange 13. In FIGS. 5 and 6 the joint 16 between the metals in the flange member is displaced to the cathode end side for better protection against corrosion.

Having thus described my invention, I claim:

1. An electrode assembly comprising a two-sided base plate formed as a lamination of a layer of titanium and a layer of iron intimately joined together and a number of parallel titanium and iron electrode plates projecting outwardly from opposite sides of said baes plate at essentially right angles, said electrode plates being formed of the same metal material as the side of said base plate from which said electrode plates project, so that each titanium anode projects from the titanium side of the base plate and each iron cathode projects from the iron side of said base plate.

2. An assembly according to claim 1 wherein the titanium metal layer of said base plate lamination is thicker than the iron metal layer of said base plate lamination.

3. An electrolytic cell arrangement comprising an electrode assembly that includes a base plate formed as a lamination of iron and titanium layers intimately joined together and a number of parallel electrode plates projecting outwardly from opposite sides of said base plate, said electrode plates being formed of the same said metal material as the side of said base plate from which said electrode plates project, in which iron is the anode of said electrode assembly and titanium is the cathode of said electrode assembly and wherein said base plate in combination with partition side members extending from the edges of said base plate serves as a partition wall between two cell units in an electrolytic cell.

4. An electrode asesmbly according to claim 3 wherein a number of said electrode assemblies are arranged so as to have the anodes and cathodes inserted between one another in order to create a bipolar cell package.

5. An assembly according to claim 3 wherein the anodic metal layer of said base plate lamination is thicker than the cathodic metal layer of said base plate lamination.

References Cited
UNITED STATES PATENTS

| | | | |
|---|---|---|---|
| 3,563,878 | 2/1971 | Grotheer | 204—286 |
| 3,337,443 | 8/1967 | Raetzsch et al. | 204—254 |
| 3,441,495 | 4/1969 | Colman | 204—268 |
| 3,410,784 | 11/1968 | Maunsell et al. | 204—268 |

FOREIGN PATENTS

| | | | |
|---|---|---|---|
| 1,127,484 | 9/1968 | Great Britain | 204—266 |

F. C. EDMUNDSON, Primary Examiner

U.S. Cl. X.R.

204—254, 286, 285, 290 F

UNITED STATES PATENT OFFICE
CERTIFICATE OF CORRECTION

Patent No. 3,759,815      Dated September 18, 1973

Inventor(s) KARL-GEORG LARSSON

It is certified that error appears in the above-identified patent and that said Letters Patent are hereby corrected as shown below:

Column 4, Claim 3, line 36, "anode" should be --- cathode---.

Column 4, Claim 3, line 37, "cathode" should be --- anode ---.

Signed and sealed this 6th day of August 1974.

(SEAL)
Attest:

McCOY M. GIBSON, JR.
Attesting Officer

C. MARSHALL DANN
Commissioner of Patents